United States Patent [19]

Stamer

[11] 4,157,574
[45] Jun. 5, 1979

[54] NOISE REDUCTION CIRCUIT FOR MULTIPLE GAP MAGNETIC HEAD FOR AUTOMATIC TYPEWRITER

[75] Inventor: Michael Stamer, Lincolnwood, Ill.

[73] Assignee: A. B. Dick Company, Chicago, Ill.

[21] Appl. No.: 797,014

[22] Filed: May 16, 1977

[51] Int. Cl.² .............................. G11B 5/47; G11B 5/20
[52] U.S. Cl. ........................................ 360/66; 360/67; 360/124
[58] Field of Search .................... 360/67, 66, 118, 123, 360/124, 62, 63

[56] References Cited

U.S. PATENT DOCUMENTS 3,707,707  12/1972  Spencer et al. .................... 360/53

Primary Examiner—Vincent P. Canney
Attorney, Agent, or Firm—Peter S. Lucyshyn

[57] ABSTRACT

A noise reductive circuit for use with an automatic typewriter of the type that uses a multiple inductance, multiple magnetic gap head for translating information to and from a magnetic recording media is disclosed which includes an electric circuit between one of the inductances to the signal handling channel of the other of the inductances so as to couple to it a noise reducing signal.

3 Claims, 3 Drawing Figures

NOISE REDUCTION CIRCUIT FOR MULTIPLE GAP MAGNETIC HEAD FOR AUTOMATIC TYPEWRITER

FIELD OF THE INVENTION

The present invention relates to a noise reductive circuit for multiple gap magnetic heads and is especially useful in the environment of an automatic typewriter using such a head.

BACKGROUND OF THE INVENTION

Automatic typewriters of the type that employ a magnetic recording media, such as a magnetic media mounted on a data processing card, have become popular and useful tools in the office. In some such systems a card is driven back and forth under a head which both picks up information from it and records on it, and also erases information from it. The head may be driven across the card to operate on different "channels" thereon. One such head, for example, that used in the Magna I brand of an automatic typewriter has one inductance coil and gap for picking up and recording of information and a second inductance coil and gap adjacent thereto for erasing information. Both of these inductances have circuitry associated with them; the first one having circuitry for translating electrical signals to and from the inductance and the second one having circuitry for transferring an erasing signal to it.

In this environment, a problem of unwanted "noise" was found to exist in the reading mode. The source of this noise was at first unknown, and it was thought necessary in dealing with it to employ a special and expensive head. The present inventor, however, has discovered that the source of this noise is magnetic flux linkage between the erase gap and the reading coil. That is, the erase gap when not being used for erasing, serves as a second pick up and having its core closely associated with the core of the reading gap generates an electric signal in the reading inductance coil. Because the gaps are physically separated and usually physically different, the signal developed at the erase inductance is different than that of the read signal and it is this signal that is the unwanted noise.

SUMMARY OF THE INVENTION

To solve the problem of this unwanted noise, the present invention provides an electric circuit means coupled to the inductance of the second gap which generates an electric signal therefrom which is so related to the noise signal as to the unwanted signal as to cancel or reduce it, and provides means for coupling this signal into the first inductance signal handling channel to reduce or cancel the unwanted noise. The result is that for a small expense in circuitry, a relatively inexpensive head may be made to behave as a relatively expensive head.

The invention, together with the advantages thereof, may best be understood by reference to the following description taken in connection with the accompanying drawings, in the several figures of which like reference numerals identify like elements.

DETAILED DESCRIPTION

Figure 1:
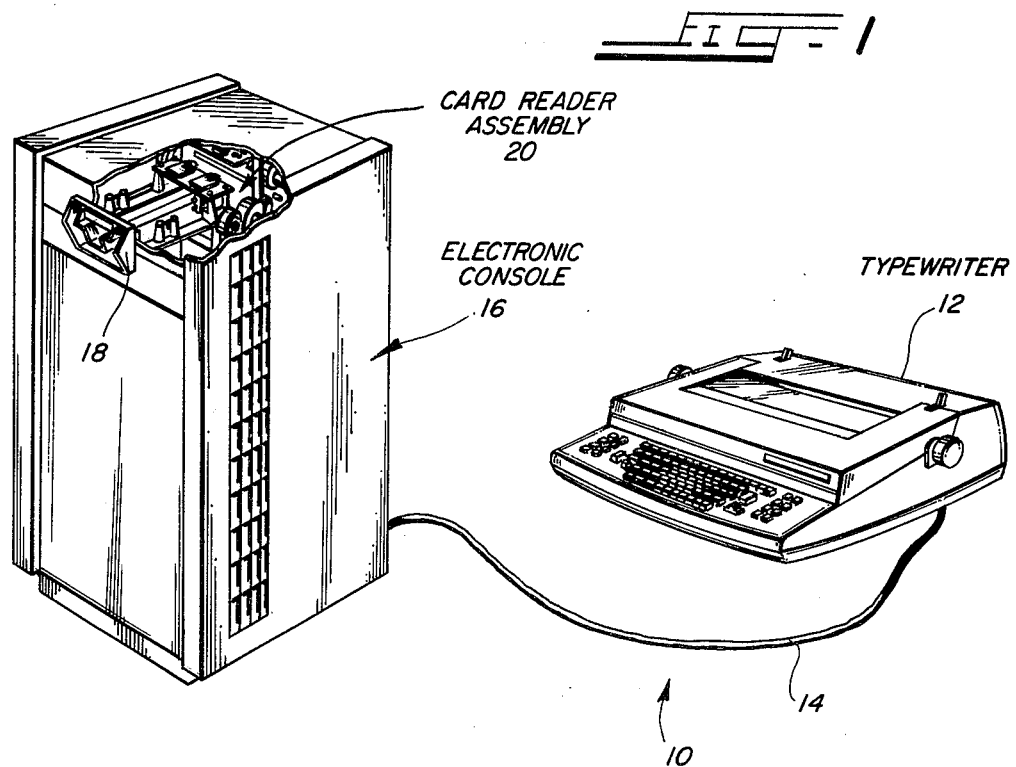
FIG. 1 is a perspective view of an automatic typewriter system which is partly broken away to show interior parts, and in which the present invention may be employed.

Referring to FIG. 1, there is depicted an automatic typewriter system which is generally indicated by the number 10. The system 10 includes, as an input-output device, an electronic typewriter 12, which is connected via a cable 14 to a console 16 which includes the major portion of the system's electronics, such as a floating or temporary memory and microprocessor or computer. The console 16 also includes a magnetic card entrance unit 18 into which a magnetic card may be inserted. The magnetic card serves as the permanent memory for the system and information may be recorded on it, read off of it or erased from it.

The console 16 also includes a card reader assembly 20 which, during use serves to drive a magnetic card back and forth under a magnetic haed which is positioned across the path of the card. The lateral position of the head is altered to select different channels on the card on which to operate.

Figure 2:
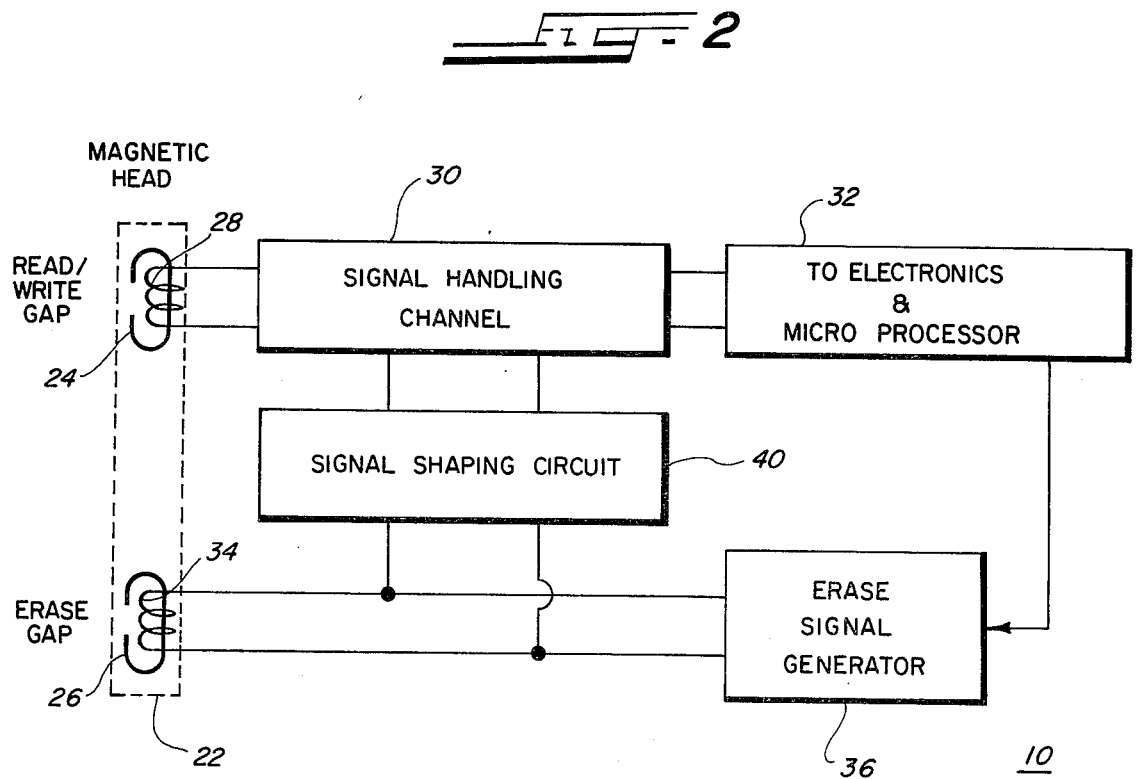
FIG. 2 is a block diagram illustrating a portion of the system of FIG. 1 employing the invention.

The magnetic head is schematically depicted in FIG. 2 and designated generally by the number 22. From FIG. 2 it can be observed that the head includes a read/write gap 24 and an erase gap 26. An inductance 28 is primarily associated with the gap 24 and serves to both develop an electronic signal from the changes in magnetic flux as the card passes below the head 22 and to change the magnetic state on the card in response to signals impressed on it. These signals are coupled to and from the inductance 28 through a signal handling channel generally designated 30, to the electronics and microprocessor of the system which are generally designated 32.

The erase gap 26 serves only to erase a channel on the magnetic card and it, in general, has a different physical arrangement and a different value inductance 34. An erase signal is generated from a suitable generator 36 in response to a command from the microprocessor 32.

In accordance with the present invention a signal shaping circuit 40 is provided between the inductance 34 and the signal handling channel 30, which circuit 40 serves to derive a signal from the erase gap inductance 34 during periods when it is not serving to erase, and shapes that signal so as to reduce or eliminate noise produced in the signal handling channel 30 by unwanted flux linkage from the gap 26 to the coil 28.

Figure 3:
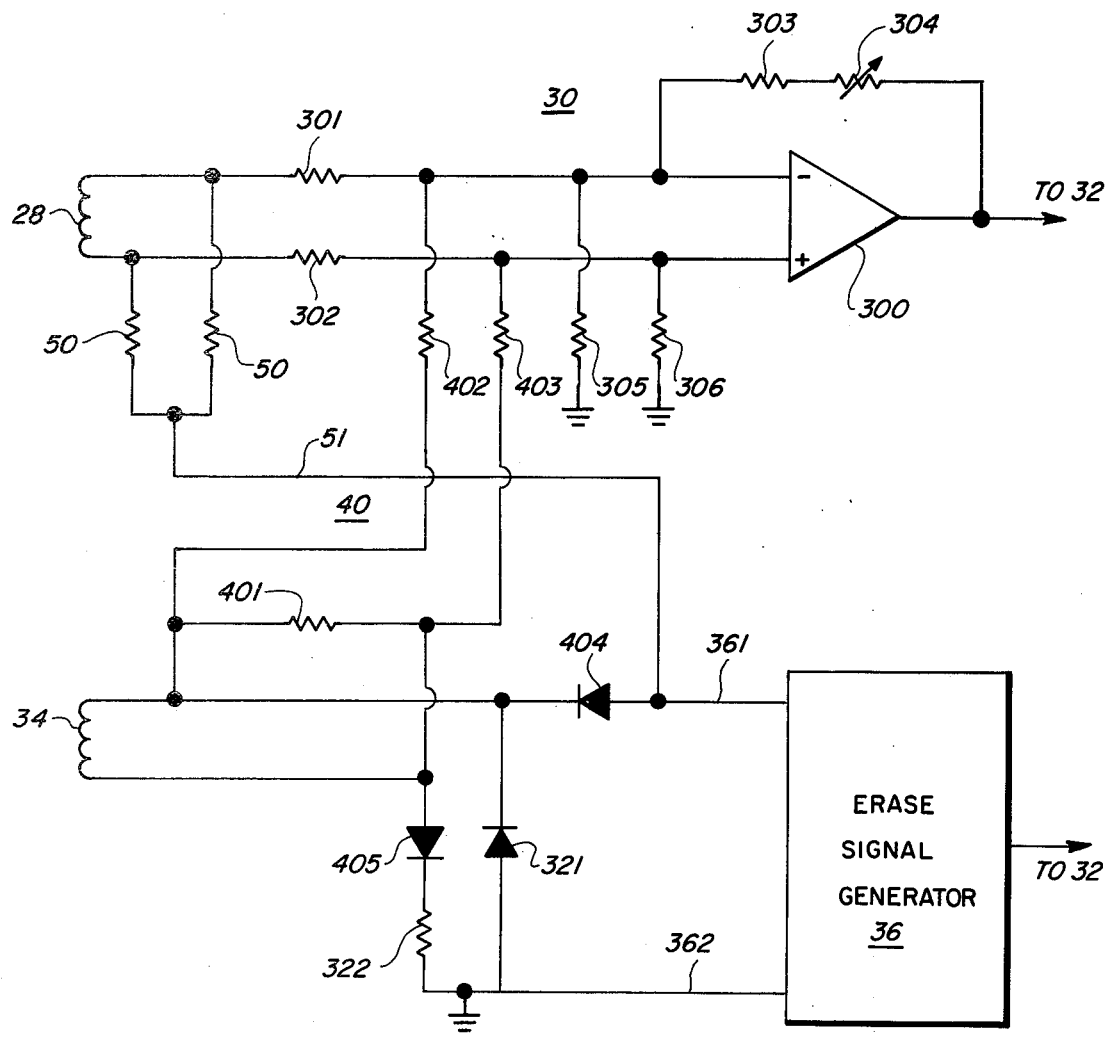
FIG. 3 is a circuit diagram of a portion of the typewriter system of FIG. 2 illustrating one specific embodiment of the present invention.

Referring to FIG. 3, one specific embodiment of the invention is there depicted. The writing circuitry has not been shown. In this embodiment the read signal handling channel 30 includes an operational amplifier 300 which is connected to amplify the signal from the inductance coil 28. (The actual effective circuit of the physical coil 28 as well as the physical coil 34 does, at the frequencies involved, include some inter-turn capacitance and internal resistance.)

Each end of the coil 28 is connected through a resistor 301, 302, to the negative and positive inputs of the operational amplifier 300 which has a feedback circuit comprising a fixed resistor 303 and variable resistor 304, a series connected between the amplifier's output and its negative input. The inputs of the operational amplifier 300 are connected to ground through resistors 305 and 306.

Each end of the coil 28 is also connected to one end of a pair of resistors 50 whose other ends are connected together and join a line 51 to the output of the erase signal generator 36.

The erase signal generator 36 produces a saturating positive d.c. current between its outputs 361 and 362. The erase coil 34 is connected to the signal generator 36 through diodes 404 and 405 (to be discussed below) and a current limiting resistor 322. A surge suppressing diode 321 is connected in parallel with the series connection of the coil 34 and resistor 322. As thus far discussed, the circuit of FIG. 3 is (except for diodes 404 and 405) conventional. In accordance with the principles of the present invention there is provided a signal shaping and coupling circuit 40, including a resistor 401 connected across the coil 34 to approximately match the frequency loading of the erase coil 34 to that of the read coil 28, and a pair of resistors 402 and 403 connected respectively between the one and the other of the inputs of the operational amplifier 300 and one and the other ends of the inductance coil 34.

During the write mode the erase signal generator is operated to erase the channel before the read/write gap and is also used to provide voltage to the coil 28 via line 51, connected from line 361 to the junction of a series of connected pairs of resistors 50 connected across the coil 28. A suitable switching device such as a transistor (not shown) is connected between either side of the coil 28 and the ground and is switched by the electronics to cause current to flow in one direction or the other through coil 28 and thus to write on the magnetic channel.

The diodes 404 and 405 serve to electrically "float" the coil 34 when the erase signal is not present. The diodes 404 and 405 are such as to exhibit sufficient forward resistance (absent a significant voltage such as could be supplied by the source 36) as to be effectively open circuits during the read mode of operation. This allows the coil 34 to electrically float free of the chasis ground and converts the resistors 50 into a parallel resistance across the coil 28.

The diode 405 has its cathode connected to one side of the coil 34 and its anode connected through the current limiting resistor 322, to the ground. The diode 404 has its cathode connected to line 361 and its anode connected to the other side of the coil 34.

In operation, during the read mode, the noise signal produced by the flux coupled from gap 26 to inductance 28 is reduced or canceled by a similar signal produced, using inductance 34, across resistor 401 and coupled via resistors 402 and 403 to the signal sending channel 30 and subtracted therefrom. As the signal generated by gap 26 in coil 34 is related to the noise signal generated by gap 26 in coil 28, a proper choice of values for the impedance of the coupling and shaping network 40 will result in a cancelation or reduction of the noise signal. During the other modes of operation the circuit 40 does not appreciably enter into the operation of the system.

The invention was implimented and successfully tested in the intended environment of use and yielded a notable improvement in signal to noise ratio.

Although a particular impedance network made up of three resistors is depicted, it should be understood that other impedance values and arrangements may be used, such as capacitors and inductors, but because resistors are relatively less expensive they are presently preferred. Also although the diodes 404 and 405 are preferred, some of the benefits of the invention may be achieved without them.

As a concrete example, the circuit of FIG. 3 was constructed and tested satisfactorily with the following values for a DC12R21N magnetic head manufactured by Nortronics (which was not electrically modified but had its housing modified slightly to fit better against a moving magnetic card):

| Operation Amplifier 300 | LM 301 |
| --- | --- |
| Diodes 321, 404, 405 | IN 4009 |
| Resistors 301, 302, 305, 306 | 2.21 K Ohms |
| Resistors 402, 403 | 47.5 K Ohms |
| Resistors 401, 50 | 1.62 K Ohms |
| Resistor 322 | 150 Ohms |
| Resistor 303 | 121 K Ohms |
| Variable Resistor 304 | 0–100 K Ohms |

Of course, with other heads, other circuit values and arrangements would be needed or desired. And, although these are presently preferred values, the inventor may himself decide for various reasons to make changes in the circuit values and in the illustrated specific circuit.

For example, one such variance, with the signal shaping circuit having been described as a separate unit, as it is functionally, is possible for it to share components with the other circuits.

It should now be apparent that a simple solution has been provided for the problem first disclosed above. The result in the particular case of FIG. 3 is that with the addition of three resistors and two diodes, a considerable increase in performance of the magnetic head 22 can be achieved and the need for any internal modification of the head or the use of an expensive head is eliminated.

While one particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In an automatic typewriter system of the type that may employ a magnetic media on which information may be stored and erased, and which includes electric circuitry for operating a typewriter, the combination of:
    a read inductance associated with magnetic material defining a read gap adjacent to the operational position of the magnetic media;
    an erase inductance associated with magnetic material defining an erase gap, which erase gap is positioned close to said read gap;
    a read signal handling network channel coupled to said read inductance for transferring electrical signals developed in the read inductance to the electric circuitry;
    means for selectively operationally energizing the erase signal and for insuring that the erase function and the read function are not performed simultaneously;
    a signal shaping circuit coupled between the erase inductance and said read signal handling network channel for developing a noise reducing signal from signals picked up by said erase inductance when it is not operationally energized and coupling it to said channel so as to add it to the signal developed by said read inductance during the read function, said signal shaping circuit including a first impedance in parallel with said erase inductance for frequency response shaping the erase inductance circuit to match the frequency response of the read inductance circuit.

2. The combination of claim 1 wherein said signal shaping circuit comprises a resistive network which is connected to the erase inductance and to said signal handling network channel.

3. The invention of claim 2 wherein said erase inductance is isolated from ground during the read mode of operation by means of diodes.

* * * * *